C. MESSICK.
TRANSPORTATION SCRIP AND MILEAGE TICKET.
APPLICATION FILED FEB. 7, 1910.
1,011,223.
Patented Dec. 12, 1911.
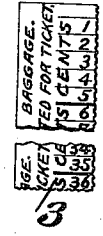

UNITED STATES PATENT OFFICE.

CHARLTON MESSICK, OF ST. LOUIS, MISSOURI.

TRANSPORTATION SCRIP AND MILEAGE TICKET.

1,011,223.  Specification of Letters Patent.  Patented Dec. 12, 1911.

Application filed February 7, 1910. Serial No. 542,536.

*To all whom it may concern:*

Be it known that I, CHARLTON MESSICK, a citizen of the United States, and a resident of the city of St. Louis and State of Missouri, have invented a new and useful Improvement in Transportation Scrip and Mileage Tickets, of which the following is a specification.

This invention relates to transportation scrip and mileage tickets.

It has for its principal objects to produce a scrip or substitute for cash which may be tendered in payment for transportation or other privileges, to provide for the use of the scrip in cases where the holder is accorded a net rate or a rate lower than the maximum rate, to provide for the automatic detachment of a net amount, to simplify the means of identification and facilitate accounting, and to attain certain other advantages hereinafter more fully appearing.

The invention consists in the parts and in the arrangements and combinations of parts hereinafter described and claimed.

In the accompanying drawing which forms part of this specification and wherein like symbols refer to like parts wherever they occur, Figure 1 is a face view of a portion of a scrip ticket embodying my invention; Fig. 2 is a fragmentary view of a portion of the baggage strip detached; Fig. 3 is a fragmentary view of a portion of the money strip detached; and Fig. 4 is a fragmentary view of a portion of the identification strip detached.

As shown in the drawings, the ticket comprises a money strip 1, an identification strip 2 and a baggage strip 3, the ticket being preferably scored lengthwise for convenience in separating the different strips. The strip 1 is marked off with a multiplicity of equal spaces which are consecutively numbered, the numbers $1^a$ appearing along the marginal portion of the strip and each space being equivalent to one cent. Preferably, for convenience in figuring, a distinguishing line or mark is provided at each interval of five spaces and the space between each of said distinguishing lines or marks may be printed with the initials or name of the issuing railroad, identification numbers or other symbols, and the valuation of the strip.

The identification strip 2 is marked with identification and other symbols which correspond with the symbols on the money strip 1. This strip 2 is provided with numbers $2^a$ corresponding to the normal valuation numbers on the strip 1. The strip 2 is also provided on its face with a space $2^b$ for the signature of the holder of the ticket or some other specified marking or symbol by which he may be identified. This space $2^b$ is preferably a continuous column so that the signature or identification mark of the holder may be placed on any portion of the ticket which is detached as used. The baggage strip 3 is marked with graduations corresponding to the graduations on the strip 1 and it may also have symbols thereon which are identical with those on the strips 1 and 2.

In the use of the scrip, if the same is tendered for a cash fare, the conductor or collector will detach the amount designated by the tariff rate between the starting point and the point of destination of the trip for which the passenger tenders the scrip. For example, suppose the rate is three cents a mile and the passenger is traveling twelve miles: The tariff rate table will show that the fare is thirty-six cents. In this case, the ticket will be torn entirely across on a transverse line immediately above the number 37 in the normal or cash value column $1^a$ as indicated by the line $x$—$x$ in Fig. 1, said number 37 being the sum of 36 and 1, which latter number is at the top of the strip, provided, of course, no detachments have been previously made. If portions of the scrip have been previously detached, then the amount of 36 will be added to the number at the end of the ticket and the ticket will then be separated on a transverse line above the number corresponding to the sum of 36 and said number which appears at the end of the ticket.

In case the passenger desires to check baggage when the scrip is to be tendered in payment of a cash fare, the baggage agent will detach a portion of the baggage strip 3 corresponding to the scrip which is to be detached for the holder's transportation. When the scrip is presented for transportation, the conductor or collector will detach that portion of the strips 1 and 2 which corresponds to the portion of the baggage strip 3 which has been previously detached by the baggage agent.

When the scrip is tendered in payment for a trip ticket, the selling agent may detach the corresponding portions of the money strip 1 and baggage strip 3 for the amount corresponding to the value of the ticket issued, leaving the identification strip 2 intact. When the trip ticket is tendered for transportation, the scrip ticket is presented therewith and the conductor or collector will tear off that portion of the identification strip 2 which corresponds to the portions of the money strip 1 and baggage strip 3 which have been previously removed for the purchase of the trip ticket. In any case, whether the scrip ticket is tendered in payment of a cash fare or in connection with a trip ticket, the conductor will require the passenger to sign his name on the face of the identification strip to indicate that the original purchaser of the scrip is using the same.

In some States where a certain maximum rate obtains, the holder of a scrip book or ticket is accorded a lower or net rate under certain tariff conditions. That is, for example, in a three cent State, a two and one-half cent net rate might obtain. Therefore, to eliminate a great amount of figuring on the part of conductors and others to readily determine the amount to be detached to accord the passenger the benefit of the net rate, a proportional scale is provided on the scrip in such a manner that, by making the detachment based on the maximum rate but figured on the proportional scale, the net amount as represented by the normal or cash value scale is automatically detached. As shown in Fig. 1, the normal or cash value column of figures $1^a$ is at the marginal portion of the strip 1, while the proportional scale $1^b$, which, in this case is of the ratio of 6:5, is located approximately in the middle of the strip; and it is preferably printed in a distinguishing color from that of said normal or cash value scale. However, where the passenger is to be accorded no less than the maximum rate, the detachment will be based on the normal or cash value column $1^a$. Obviously, a plurality of proportional scales may be provided; and, in some cases, the proportional scales may be placed on the back of the strip instead of the face thereof as shown.

For an example of the use of the proportional scale $1^b$, assume that the maximum rate is thirty-six cents based on three cents a mile and that the passenger is accorded a net rate of two and one-half cents: The detachment being based on 36 added to the top figure in the proportional scale, for example, the number 1, the result will be 37; and, by detaching immediately above the number 37 in the proportional scale or column $1^b$, on the line $y$—$y$ of Fig. 1, it will be found that the normal or cash value column $1^a$ of the detachment will represent thirty cents, which is the net amount.

While the ticket has been shown in the drawing as representing money scrip, obviously the same may be arranged as a mileage ticket. That is, instead of having spaces marked to indicate a money value, the same may be marked to indicate mileage. In such cases, also, the proportional scale or scales may be provided and marked on the face or on the back of the strip, as desired.

A scrip book or ticket arranged according to my invention may be used interchangeably over different railroads, either intrastate or interstate and at different proportional rates based on a given maximum rate. The signing of the identification strip on its face facilitates the work of accounting as it is unnecessary to turn each strip over to examine the signature after matching the several detached portions thereof with the balance of the ticket as would be the case if the strip were signed on the back. In the case of a straight mileage ticket, a blank space may be left on the face of the mileage strip for the signature. The use of the identification strip obviates the necessity of filling out separate identification coupons and affords, for simplification in accounting, substantially a duplicate of the money strip used.

Obviously, the scrip or mileage ticket admits of considerable modification without departing from my invention. Therefore, I do not wish to be limited to the specific form and arrangement shown.

What I claim is:

1. A ticket comprising a continuous strip which is perforated or scored longitudinally to constitute separable strips, one of said strips being marked transversely to provide a multiplicity of units, and the other strip being marked substantially in duplication of said unit strip and having on its face a continuous longitudinal blank space indicated for the signature of the holder or equivalent identification matter, so that the signature or its equivalent may be placed on the face of any section on said strip which is detached as used.

2. A ticket comprising a continuous strip which is perforated or scored longitudinally to constitute two separable strips, one of said strips being marked transversely to provide a multiplicity of scrip units of equal value, and also having a multiplicity of identification symbols on its face, and the other strip being marked on its face substantially in duplication of said scrip strip and being also provided on its face with a continuous longitudinal blank space indicated for the signature of the holder or equivalent identification matter, so that the signature or its equivalent may be placed on the face of any section of said strip which is detached as used.

3. A scrip ticket comprising a normal series of scrip units of equal value and a second series of scrip units of equal value but based on a proportional rating with respect to said normal series and so correlated thereto that, when a number of units of a certain total valuation are deducted from one series, a number of units of an equivalent proportional total valuation are automatically deducted from the other series.

4. A scrip ticket comprising a normal series of scrip units of equal value and a second series of scrip units of equal value but based on a proportional rating with respect to said normal series and so correlated thereto that, when a number of units of a certain total valuation are deducted from one series, a number of units of an equivalent proportional total valuation are automatically deducted from the other series, said two series of scrip units being each consecutively numbered.

5. A scrip ticket comprising a continuous strip which is marked transversely to provide a normal series of scrip units of equal value and being also distinctively marked to provide a second series of scrip units of equal value but based on a proportional rating with respect to said normal series of units and so correlated thereto that, when a number of units of a certain total valuation are deducted from one series a number of units of an equivalent proportional total valuation are automatically deducted from the other series.

6. A scrip ticket comprising a continuous strip which is marked transversely to provide a normal series of scrip units of equal value and being also distinctively marked to provide a second series of scrip units of equal value but based on a proportional rating with respect to said normal series of units and so correlated thereto that, when a number of units of a certain total valuation are detached from one series a number of units of an equivalent proportional total valuation are automatically detached from the other series, said two correlated series of scrip units being each consecutively numbered.

7. A scrip ticket comprising a continuous strip which is marked transversely to provide a normal series of scrip units of equal value and being also distinctively marked to provide a second series of scrip units of equal value but based on a proportional rating with respect to said normal series of units and so correlated thereto, that when a number of units of a certain total valuation are detached from one series a number of units of an equivalent proportional total valuation are automatically detached from the other series, said ticket being marked on its face with a multiplicity of identification symbols.

8. A scrip ticket comprising a continuous strip which is marked transversely to provide a normal series of scrip units of equal value and being also distinctively marked to provide a second series of scrip units of equal valve but based on a proportional rating with respect to said normal series of units and so correlated thereto that, when a number of units of a certain total valuation are deducted from one series a number of units of an equivalent proportional total valuation are automatically deducted from the other series, said ticket being marked on its face with a multiplicity of identification symbols and being also provided on its face with a space for placing further identification marks on the portions of the ticket which are detached as used.

9. A scrip ticket comprising a continuous strip which is separable lengthwise to constitute two separable strips, one of said strips being marked transversely to provide a normal series of scrip units of equal value, said strip being also distinctively marked transversely to provide a second series of scrip units of equal value but based on a proportional rating with respect to said normal series of units and so correlated thereto that, when a number of units of a certain total valuation are deducted from one series, a number of units of an equivalent proportional total valuation are automatically deducted from the other series, said scrip unit strip also having on its face a multiplicity of identification symbols, and said second strip having on its face a multiplicity of identification symbols corresponding to the symbols on said scrip unit strip and being also provided on its face with a space for placing further identification marks on the portions of the strip which are detached as used.

Signed at St. Louis, Mo., this 5th day of February, 1910.

CHARLTON MESSICK.

Witnesses:
G. A. PENNINGTON,
J. B. MEGOWN.

---

Copies of this patent may be obtained for five cents each, by addressing the "Commissioner of Patents, Washington, D. C."